(12) United States Patent
Spotti

(10) Patent No.: US 12,374,889 B2
(45) Date of Patent: Jul. 29, 2025

(54) ADAPTIVE SYSTEM FOR MANAGING ENERGY COMMUNITIES WITH VARIABLE CONFIGURATION

(71) Applicant: REGAL GRID S.R.L., Rome (IT)

(72) Inventor: Davide Spotti, Rome (IT)

( * ) Notice: Subject to any disclaimer, the term of this patent is extended or adjusted under 35 U.S.C. 154(b) by 536 days.

(21) Appl. No.: 17/777,970

(22) PCT Filed: Nov. 20, 2019

(86) PCT No.: PCT/IB2019/059982
§ 371 (c)(1),
(2) Date: May 18, 2022

(87) PCT Pub. No.: WO2021/099819
PCT Pub. Date: May 27, 2021

(65) Prior Publication Data
US 2023/0006448 A1  Jan. 5, 2023

(51) Int. Cl.
*H02J 3/14* (2006.01)
*B60L 53/30* (2019.01)
(Continued)

(52) U.S. Cl.
CPC .............. *H02J 3/14* (2013.01); *B60L 53/30* (2019.02); *B60L 53/51* (2019.02); *B60L 53/68* (2019.02);
(Continued)

(58) Field of Classification Search
CPC .. H02J 3/28; H02J 3/381; H02J 7/0048; H02J 13/00002; H02J 13/00004; H02J 13/0028; B60L 53/30; B60L 53/51; B60L 53/58
See application file for complete search history.

(56) References Cited

U.S. PATENT DOCUMENTS

| 8,583,520 B1 | 11/2013 | Forbes et al. |
| 9,300,141 B2 | 3/2016 | Marhoefer |

(Continued)

FOREIGN PATENT DOCUMENTS

EP  2917991 A1  9/2015

OTHER PUBLICATIONS

International Search Report for corresponding PCT/IB2019/059982 dated Apr. 1, 2020.

(Continued)

*Primary Examiner* — Crystal J Barnes-Bullock
(74) *Attorney, Agent, or Firm* — Egbert, McDaniel & Swartz, PLLC

(57) ABSTRACT

An adaptive system for managing, in an integrated way, multiple EC with variable configuration, with prosumer and/or proconstomer and/or constorer nodes that are dynamically aggregated over the time, through a partitionable digital platform that includes logics for the automatic management. To each platform portion corresponds an EC and an oriented combination of logics in turn selected, sequenced and parametrized according to the optimization purposes provided by the EC, to locally implement, through the controller of each node, the commands imparted to its devices and optimize energy flows, by first adapting to EC logics and then to single node logics. The oriented combination is continually recalculated, within 50 milliseconds from the reading of the data of each aggregated node, to adapt in real time to the variable configuration of an EC and its nodes.

17 Claims, 7 Drawing Sheets

Figure 1:
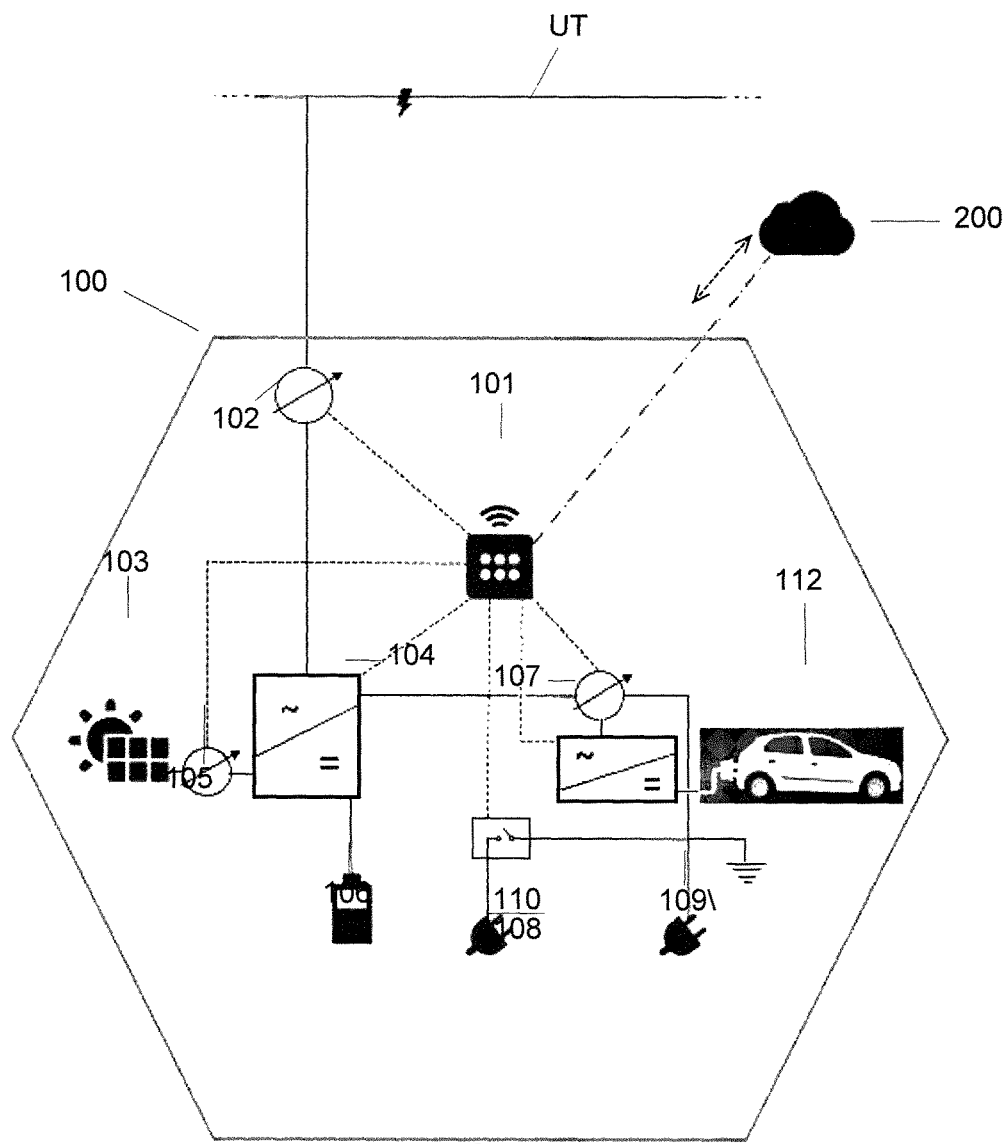

(51) Int. Cl.
  *B60L 53/51*   (2019.01)
  *B60L 53/68*   (2019.01)
  *H02J 3/28*    (2006.01)
  *H02J 3/38*    (2006.01)
  *H02J 7/00*    (2006.01)
  *H02J 13/00*   (2006.01)

(52) U.S. Cl.
  CPC ............... *H02J 3/28* (2013.01); *H02J 3/381* (2013.01); *H02J 7/0048* (2020.01); *H02J 13/00002* (2020.01); *H02J 13/00004* (2020.01); *H02J 13/00028* (2020.01); *H02J 2207/20* (2020.01); *H02J 2300/24* (2020.01)

(56) References Cited

U.S. PATENT DOCUMENTS

| | | | |
|---|---|---|---|
| 9,331,480 B2* | 5/2016 | Taft | H02J 3/00 |
| 9,634,487 B2* | 4/2017 | Spotti | H02J 3/12 |
| 9,960,637 B2 | 5/2018 | Sanders et al. | |
| 10,185,346 B2* | 1/2019 | Matan | H02J 3/50 |
| 10,295,966 B2 | 5/2019 | Blackhall et al. | |
| 10,791,020 B2* | 9/2020 | Foster | H02J 13/00024 |
| 11,080,620 B2* | 8/2021 | Ba | G06N 20/00 |
| 2008/0167931 A1 | 7/2008 | Gerstemeier et al. | |
| 2010/0217452 A1 | 8/2010 | McCord et al. | |
| 2011/0196547 A1 | 8/2011 | Park et al. | |
| 2011/0204719 A1 | 8/2011 | Sackman et al. | |
| 2012/0029720 A1 | 2/2012 | Cherian et al. | |
| 2012/0316696 A1 | 12/2012 | Boardman et al. | |
| 2013/0262197 A1 | 10/2013 | Kaulgud et al. | |
| 2014/0249688 A1 | 9/2014 | Ansari et al. | |
| 2016/0079757 A1 | 3/2016 | Matan et al. | |
| 2017/0373509 A1 | 12/2017 | Betzin et al. | |
| 2018/0123391 A1* | 5/2018 | Lakamp | H02J 13/00028 |
| 2021/0221247 A1* | 7/2021 | Daniel | G06Q 10/06 |
| 2022/0043038 A1* | 2/2022 | Matan | H02J 3/46 |

OTHER PUBLICATIONS

Written Opinion of the International Searching Authority for corresponding PCT/IB2019/059982 dated Apr. 1, 2020.

* cited by examiner

ADAPTIVE SYSTEM FOR MANAGING ENERGY COMMUNITIES WITH VARIABLE CONFIGURATION

This invention relates to an adaptive system for managing energy communities with variable configuration.

FIELD OF THE INVENTION

The invention finds particular application in the field of production, distribution, accumulation and measuring of the consumption of electrical or thermal energy or gas. In particular, the invention is suitable for managing, in an integrated and optimized way, the use and transfer of energy among users that are equipped with generation, accumulation and consumption elements, wherein said users are connected to an external distribution grid, which is generally a public or a private grid, and are virtually or substantially aggregated one other to form energy communities having variable configuration and aims. The proposed solution allows to manage an unlimited number of energy communities with an unlimited number of energy nodes dynamically aggregated over the time, by automatically adapting to the virtual or substantial aggregation perimeter of each energy community, to the variable conditions of participation of the nodes and to the variable equipment of each node. The invention simplifies the creation and the management of new energy communities by a general provider or a specific aggregation administrator, and also simplifies the entry and exit of a single user in/from energy communities, to temporarily participate in the same and in a customizable way.

In principle, nowadays the most evolved and advantageous solutions to exchange energy between active users called prosumer and/or proconstomer and/or constorer namely, respectively, producer-consumer and producer-consumer-storer and consumer-storer, are typically applied to single users, which are interconnected one another through a one-to-one type of dynamics, where a user produces and backs energy to the external grid that redistributes or accumulates it; this one-to-one dynamics can be reformulated on multiple interconnected users, in such a way as to form a local energy grid, also called micro-grid, where energy and information exchanges occur between the above-mentioned active users, called nodes, generally with the aim of balancing flows and/or reducing the draw offs from the exterior, thus triggering a one-to-many dynamics. In these cases, the logics of management of said grid are directed to the advantage and the optimization of the single node, or are directed to the relation existing between a node and the external distribution grid to which it is possibly connected. By way of example only, refer to the advantageous solution of the one-to-one type in EP2917991B1 (Spotti), where a particular node controller is connected to the controllers of the others nodes and manages, with shared programs, the production, consumption and accumulation devices of its node, in such a way as to create an advantageous local grid of the self-configurable type; also in this case, however, the optimization priority is directed to the single user and not to the group to which it belongs.

It was therefore found that the advantages resulting from an energy sharing system, where the exchanges are of the one-to-one type, can be economic, or concern performance and energy efficiency, but are inevitably based on the behaviour or management of a single node considered in the ensemble of its energy assets, namely its generation, accumulation and consumption elements, towards the public grid operator or an intermediary, such as an energy trader. Generally, in fact, said operator or said trader draws off purchasing, or backs selling, the exchanged energy. In particular, it has been found that said one-to-one exchange solutions are not advantageously implementable to more evolved aggregation forms, generally called energy community or EC with an acronym or called virtual power plant or VPP with an acronym, wherein multiple nodes consisting of prosumers and/or proconstomers and/or constorers of a same distribution grid, even located far one another, are virtually aggregated like a temporary community in order to share some purposes and/or energy use modes. Recently, in particular in the energy sector, the demand for new forms of aggregation has emerged, which are able to allow a greater flexibility in the forms of management and participation, and also to simultaneously consider a high number of nodes and variables.

The management system proposed by this invention overcomes the conventional one-to-one approach, which is typical of local grids with nodes close one another and aggregated in a stable way, providing energy communities with nodes aggregated in a variable way and dynamics of exchange between the nodes that are of the one-to-many type and also of the many-to-many type. Essentially, an innovative system for managing, in an integrated and simplified way, multiple energy communities with variable configuration is proposed, with logics of management that aim in turn at optimizing both the relation between said energy communities and the nodes composing them, and the relation between single energy communities and said external grid to which they are connected. The invention is suitable for the management and exchange of electrical power, but also for heat or gas energy.

In general, in a complex system made up of elements that interact by continuously changing themselves, the difficulty in simultaneously managing multiple variable is widely known. More in detail in the energy sector, by way of example only, just consider the difficulty of managing energy flows among a high number of users aggregated in temporary groups, of said VPP or EC type, when the membership and/or modes of participation to a group are frequently modifiable, both by a service provider and by a single user or node. It may, in fact, occur that a user intends to change from one group to another to enjoy the benefits offered by a different group, or due to changings to technological devices or any changed condition within or outside the group. In particular, nowadays, there is a need for a shared and customizable management system for nodes aggregated according to one-to-many and/or many-to-many dynamics, with group priority rather than single user, and able to simultaneously consider the multiple variable existing both at a group and node level, in order to then adapt the instructions to be imparted to the different devices of each single node.

Furthermore, thanks to the recent diffusion of new technologies for the production and the distributed accumulation of renewable energy and also to promote a greater liberalization of energy market, it has been noticed a urgent need to overcome the traditional models of centralized distribution for the purpose of creating new and advantageous models of variable aggregation, which are also suitable to facilitate the creation of energy communities having a variable and non-continuous perimeter, that is virtual, in such a way as to allow a node to enter or exit in a simplified way in/from an energy community, depending on its own convenience, or group convenience or both, and also to freely change its own mode of participation in the group. However, it has been found that this distribution and grouping model requires an improved management system as regards known and conventional ones, which is able to simultaneously consider said node and group variables, and also able to integrate multiple different groups with different needs. Consider, by way of example only, the different needs that a single node provided with special production and/or accumulation devices can have as regards another node that temporarily requires a greater peak power, or consider the information, statistical or privacy needs that are typical of a provider that manages the IT platform used to manage said energy communities, rather than the economic or invoicing purposes the service provider that manages a single energy community may have.

It has therefore been found that energy industry, nowadays, requires evolved aggregation models behaving like high complex systems, consisting of many elements in continuous evolution, like living elements, for which the known systems based on predictive and/or deterministic management are not suitable, and also pre-set algorithms, as used in closed systems with one-to-one dynamics, are not suitable. Instead, it has been found that a modern energy system, where groupings have a high degree of variability, with interaction dynamics of the one-to-many or many-to-many type, mainly requires management logics that are suitable to optimize and automatize the control of said groupings, allowing as well to customize some parameters or expected advantages.

The innovative proposed system allows to manage multiple energy communities with variable configuration in an integrated and optimized way, according to purposes that are in turn different and customizable, first in the interest of the group, as primary goal, and then in the interest of the single node participant, as secondary goal. The invention considerably simplifies the commercial and operational activity of any service provider that intends to constitute a new EC having, for example, specific energy exchange and/or use and/or marketing modes, with specific advantages at a group level; moreover, it simplifies the participation in an EC of a prosumer or proconstomer or constorer node, including multiple variables of participation modes and a customization for each user, to locally obtain specific advantages.

PRIOR ART

In order to determine the state of the art concerning the proposed solution, a conventional verification was carried out, querying public archives, which led to the identification of some prior art, among them:
D1: EP2917991 (Spotti)
D2: U.S. Ser. No. 10/295,966 (Blackhall et al.)
D3: US20170373509 (Betzin et al.)
D4: U.S. Pat. No. 9,960,637 (Sanders et al.)
D5: U.S. Pat. No. 9,300,141 (Marhoefer)

D1 proposes a local grid architecture system consisting of at least two nodes, each of them managed by a node controller directly connected to the controllers of the others nodes and to the single energy generation, accumulation and consumption elements of its own node, such elements being variable in their configuration and dynamic in their behaviour; said node controller provides to the optimization of the energy transfers between the nodes according to specific routine and sub-routine management logics.

D2 describes a system for controlling a plurality of energy storage systems associated with a corresponding plurality of customers, with at least one storage device configured to store time-series data and customer specific data, and with one centralized processor configured to receive said data and to develop a customer specific control model for the plurality of customers.

D3 proposes a method for buffering of electrical energy for electrical loads, including a plurality of distributed electrical energy storage systems interconnected by transmission lines of an electrical power plant network, the method comprising: detecting the states of charge, otherwise known as soc, and adjusting the individual soc by transmitting balancing, electrical equalization charges from energy storage systems having a relatively high soc to others having a relatively low soc.

D4 describes a software platform in communication with networked distributed energy resource energy storage apparatus, including various rules, constraints of predictive algorithms for signal inputs to determine incremental storage cycles, cycle life degradation marginal cost, iterative and forward event schedule development, and load control.

D5 proposes a system for creating a scalable building block for a virtual power plant, where individual buildings can incorporate on-site renewable energy assets and energy storage. Each building block can be aggregated into a virtual power plant, in which centralized control of load shifting in selected buildings, based on predictive factors or price signals, can provide bulk power for ancillary services or peak demand situations.

In conclusion, it is reasonable to consider as known:
- a local grid consisting of prosumer and/or proconstomer nodes, connected through the controllers of each node, which include programs and shared logics aiming at optimizing the management of their own node also according to changings to the behaviour and/or to the equipment of their own node and of the others nodes connected, according to an exchange dynamic of the one-to-one type;
- a most evolved form of aggregation of prosumer and/or proconstomer nodes, of the type said EC or VPP, where each group has specific and shared purposes and wherein the management is centralized;
- solutions to control multiple accumulations distributed according to a logic of the type called demand-response, which are directly or indirectly interconnected, through an external distribution grid, to an external subject that acts as a centralized aggregator of batteries, which receives by an aggregated user the request to supply or receive energy and which, within a given time, sends to another user the order to meet this request;
- a digital platform with programs for aggregating and managing energy flows among distributed accumulators, in an EC or VPP, being equipped with controllers that exchange data and use shared programs based on predictive algorithms to optimize the use of said accumulators and/or the balancing of energy of the entire EC or VPP, according to an exchange dynamic of the one-to-one type.

Drawbacks

In conclusion, we have observed that the described known solutions have drawbacks or anyway some limits.

Firstly, it has been found that the known systems to manage local grids, also in an evolved configuration such as in D1, follow said one-to-one dynamic aiming at optimizing first the node than the group, and are not advantageously implementable in a modern energy dispatching for distributed aggregations of nodes, of the VPP or EC type, wherein multiple group purposes are provided, which are prior and different to the secondary purposes of a single node, though compliable with, namely according to exchange dynamics of the type called one-to-many or many-to-many.

Secondly, it has been found that the known solutions to manage EC or VPP, for example in D3, D4 or D5, have a limited application field and do not allow a variable configuration, as substantially stable and pre-set conditions are provided for the participation of the single nodes in said EC.

Thirdly, it has been found that all the known and conventional solutions to manage EC or VPP impart commands on a predictive and/or deterministic base, that is predetermined cause/effect, and not on the real, heuristic and instantaneous behaviour of all the components of the system and all the involved variables in turn processed according to variable and configurable target functions.

Fourthly, it has been found that the known logics and/or algorithms to manage EC or VPP are generally targeted to a specific need, e.g. as it happens to optimize the use of distributed accumulations and/or share the accumulated energy, such as in D2-D5; particularly, the known solutions do not allow a service provider, or a node, to manage the exchanges in an integrated and optimized way, with multiple logics and/or execution algorithms, which may also be customized according to local needs, though safeguarding the purposes shared by the community. For example, the management system provided in D4 allows to assign a hierarchy to some operations, but with limited possibilities to combine and manage the variables. Furthermore, is not easy for a user to change the community it belongs to; and it is also not easy for a provider to manage in real time multiple node and community configuration changes.

Moreover, as a consequence of the above, there are important technological difficulties for a service provider in creating and managing new EC, with specific purposes and advantages, according to the needs of a free market in constant evolution; and yet, according to this new approach to the market of energy, where the production and accumulation resources are connected and distributed, it is not easy for a user to aggregate to new EC exiting from a less advantageous aggregation, or even to change its participation conditions. Moreover, often, it is subjected to constrains dictated by the single hardware producers, as it happens, for example, with inverters or battery chargers or charging stations for electrical vehicles, or dictated by the different communication protocols that are in turn imposed by grid operators or energy traders.

Furthermore, it has been found that the known solutions do not allow to manage, in an integrated way, multiple EC with variable configuration, like a complex system comprising multiple variables which are considered simultaneously and in real time.

Hence the need for enterprises in the sector to identify solutions that are more effective and versatile than the solutions currently existing; the aim of the present invention is also to avoid the described drawbacks.

BRIEF DESCRIPTION OF THE INVENTION

This and other objectives are reached with the present invention according to the characteristics disclosed in the appended claims, thus solving the problems set forth by means of an adaptive system for managing, in an integrated way, multiple EC with variable configuration (EC1-ECn), with prosumer and/or proconstomer and/or constorer nodes (100) dynamically aggregated over the time, through a digital platform (200) that can be partitioned and includes logics (L1-L15) for automatic management. Each portion of the platform (200/1-200/n) corresponds to an EC and to an oriented combination (CL1-CLn) of logics in turn selected, sequenced and parameterized according to the optimization purposes provided by the EC, to locally execute, by means of the controller (101) of each node, the commands imparted to its devices and optimize the energy flows, first according to the EC logics and then to those of the single node. Said oriented combination (CL1-CLn) is constantly recalculated, within 50 milliseconds from the reading of the data of each aggregated node, in order to adapt in real-time to the variable configuration of an EC and its nodes.

Aims

In this way, through the considerable creative contribution, the effect of which has allowed to reach a considerable technical progress, some objectives and advantages are achieved by solving the main problems highlighted above and, in particular, by improving the management of energy exchanges between a high number of active and distributed users that are connected to an external distribution grid to physically convey energy, and are also interconnected through an Internet services platform suitable to share information, software programs and operating modes, in order to temporarily aggregate in EC with variable configuration.

A first the aim of the present invention is to manage, in an integrated and optimized way, the transfer of energy between prosumer and/or proconstomer connected to an external distribution grid, which are virtually aggregated one another in such a way as to form one or more energy communities. In particular, the dispatching of a power source by a centralized body or a service provider is simplified, and also the participation of the single user in an exchange community offering particular advantages is simplified. The proposed management system is intended to overcome the known limits of local grids, where energy exchanges between the nodes are of the one-to-one type, allowing instead advantageous exchange dynamics of the one-to-many and also many-to-many type, according to an innovative management system based on multiple automatic management logics, which are prioritized in sequence according to a degree of importance, like a weighed sequence.

A second objective of the present invention is to allow an automatic and integrated management of one or more energy communities having a variable configuration, wherein the single nodes can be dynamically aggregated over the time, thus modifying their virtual perimeter, and they can also participate with customized modes and aims. In particular, the proposed system for managing said energy community is of the adaptive type, thus continuously and automatically modifies and prioritizes the principles underlying all energy exchanges in such a way as to continuously re-consider said variables; said prioritization, therefore, has as its main purpose the optimization of the advantages at a group level, that is said energy community, and consequently optimizes the advantages at a local level if provided by the participating node.

Another objective of the present invention, advantageous as regards the known solutions, consists in the simultaneous implementation and coexistence of different configurable and parametric management logics, made available and shared within an internet IT platform, in a protected operational mode of the cloud service type, to be easily controlled by said centralized body or external service provider, with the aim of dispatching and data analysis, and may also be accessible by said single user to manage its aggregation modes.

A further objective of the present invention is to provide an extremely rapid management system wherein energy exchanges and the management logics that underlie exchange operations are continually recalculated for the entire energy community. Specifically, the proposed system allows to complete a complete re-calculation of said management logics in less than 50 milliseconds, starting from the reading of the data of each node belonging, at that moment, to the perimeter of the energy community, to then locally implement the single commands imparted to the different nodes. Essentially, therefore, the proposed management system can be considered as an instantaneous system type, otherwise known as "in real time", so as to adapt automatically to the continuous variations detected in a group such as, for example, the virtual aggregation perimeter of each EC or VPP, participation conditions of each node and/or the specific equipment of each node.

These and other advantages will appear from the following detailed description of some preferred embodiments, with the aid of the attached schematic drawings whose execution details are not to be considered as limiting, but only illustrative.

CONTENT OF THE DRAWINGS

FIG. 1 schematically shows, by way of non-limiting example, an active energy node of said prosumer and/or proconstomer and/or constorer type, which is connected to an external energy distribution grid UT; said node is provided with multiple devices for the production and/or accumulation and/or consumption and/or use of energy, and is also provided with a node controller of smart type that directly manages the nodes and also is connected to a digital platform, like a gateway, and to a smart meter physically connected to said external grid UT. In said Figure, the connection lines in the node are intended, by way of example and by graphic convention, as follows:

continuous line=power line, for example of the type called 1P or 3P, low voltage;
regularly short-dashed line, from the node controller=communication line, for example of the type called RS 232, 486, LAN, SPI, Wi-Fi or similar;
dotted-and-dashed line, from the node controller=communication line via internet, through authorization.

Figure 2:
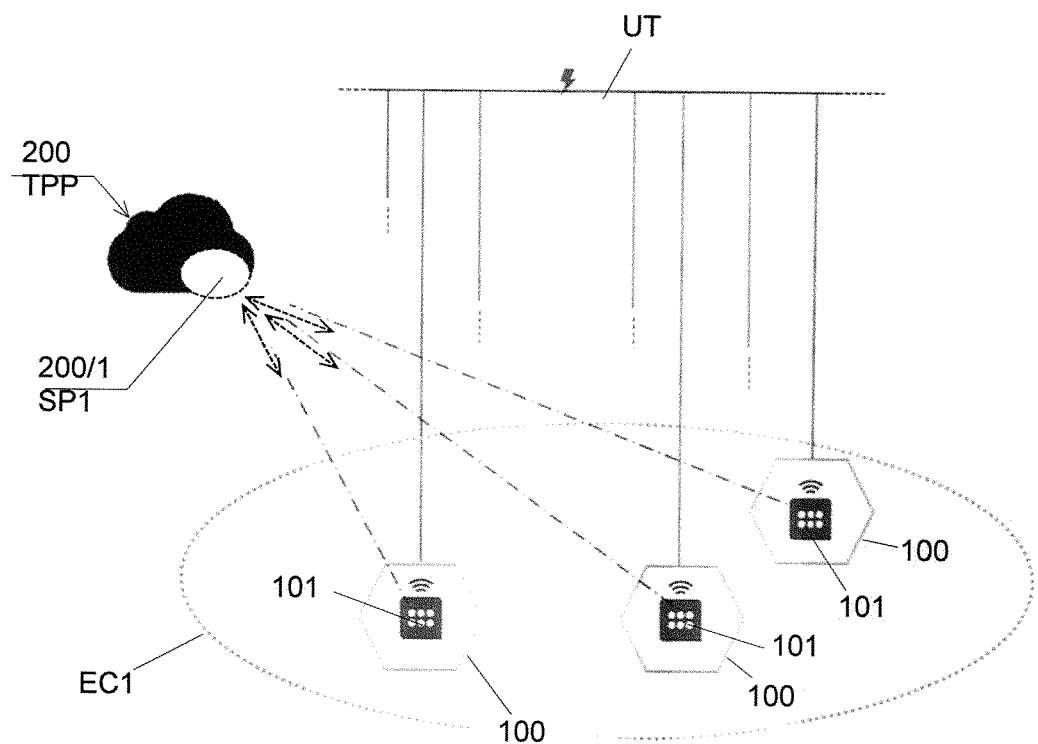

FIG. 2 schematically illustrates the virtual perimeter of an energy community with variable configuration called EC1 in the example, according to the present invention. Said perimeter virtually and temporarily contains energy nodes connected to the same external energy distribution grid, and also connected to a partitioned digital platform wherein, in a portion corresponding to said EC1, an oriented combination of management logics dedicated to it operates in cloud processing.

Figure 3:
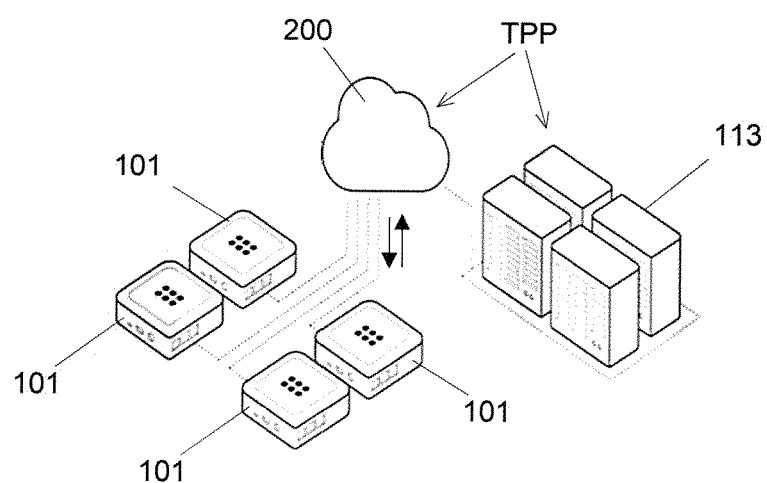

FIG. 3 schematically represents a group of node controllers bidirectionally connected to a digital partitionable platform, equipped with its own server, thus creating an energy macro-community that can be subdivided in a potentially unlimited number of active energy communities with variable configuration, as provided by the invention.

Figure 4:
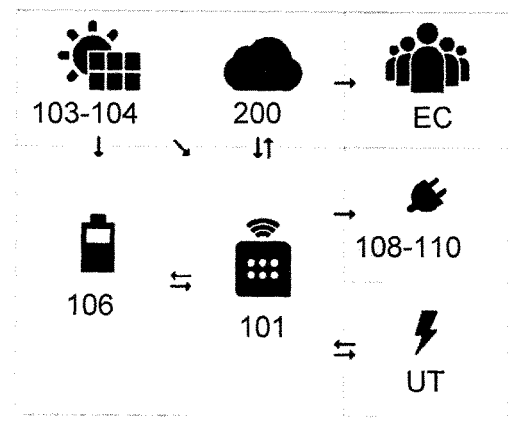

FIG. 4 schematically represents, with boxes and arrows, the relations between a controller of a prosumer and/or proconstomer and/or constorer node, and the main elements of the management system proposed by the invention, where all users participating to said system, who sign up in the digital platform like an energy macro-community, are represented in a box. Each user with its node controller, can freely and at any time aggregate to any of the groups, namely said energy communities, that are active at that moment in the digital platform, according to the modes provided by the present invention.

Figure 5:
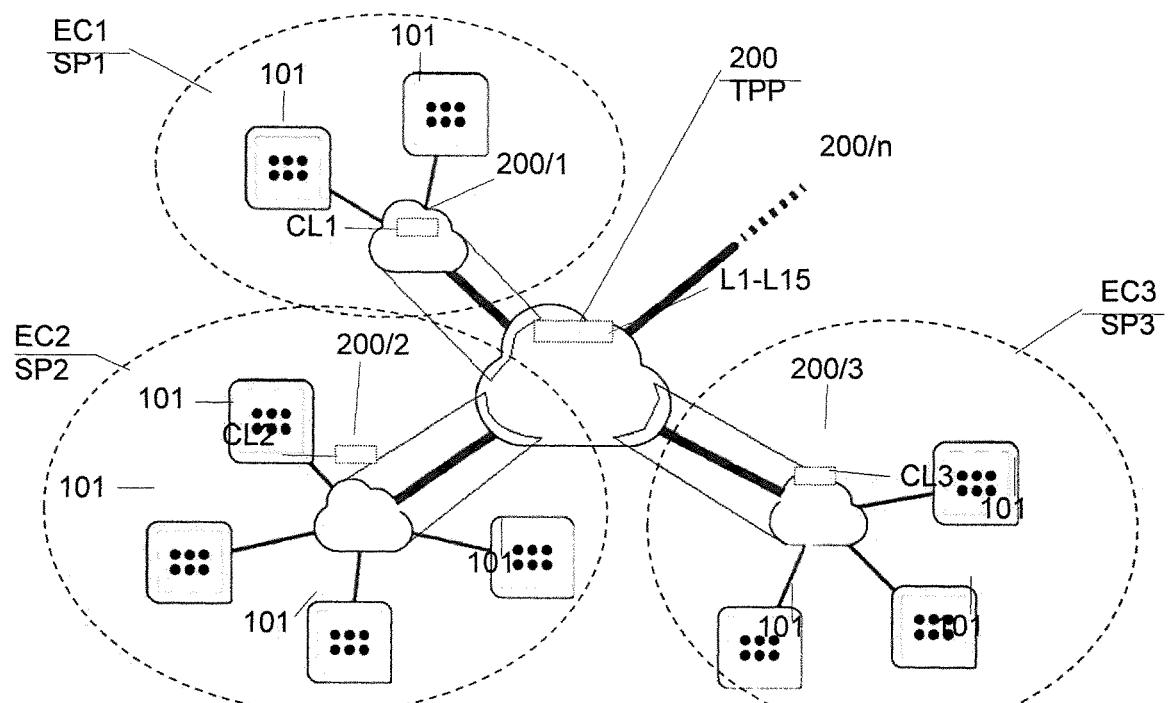

FIG. 5 is a schematic representation of the proposed management system, wherein a digital platform can be partitioned in an unlimited number of platform portions, and operates via the Internet in cloud service mode; it is here conventionally represented in the centre, being managed at a upper level by a Technology-Platform Provider (TPP) that is responsible for the same as master, wherein the management logics L1-L15 are made available in a non-combined shape, that is neutral, not selected nor sequenced. In this non-limiting example there are three platform portions (200/1-200/3), which operate at an intermediate level where the groupings occur, being interposed between the single nodes and said master (200, TPP); said platform portions are here conventionally represented as separate, but dependent on the master, like children. Each of them is managed by its own administrator or service provider (SP1-SP3), which aggregates in communities the nodes that are at that moment connected to it by means of its node controller, in such a way as to share its own oriented combination of logics (CL1-CL3) that are selected and sequenced in an optimized way according to the primary purposes of that specific energy community (EC1-EC3), possibly customizable by the user for secondary purposes, with local effects.

Figure 6:
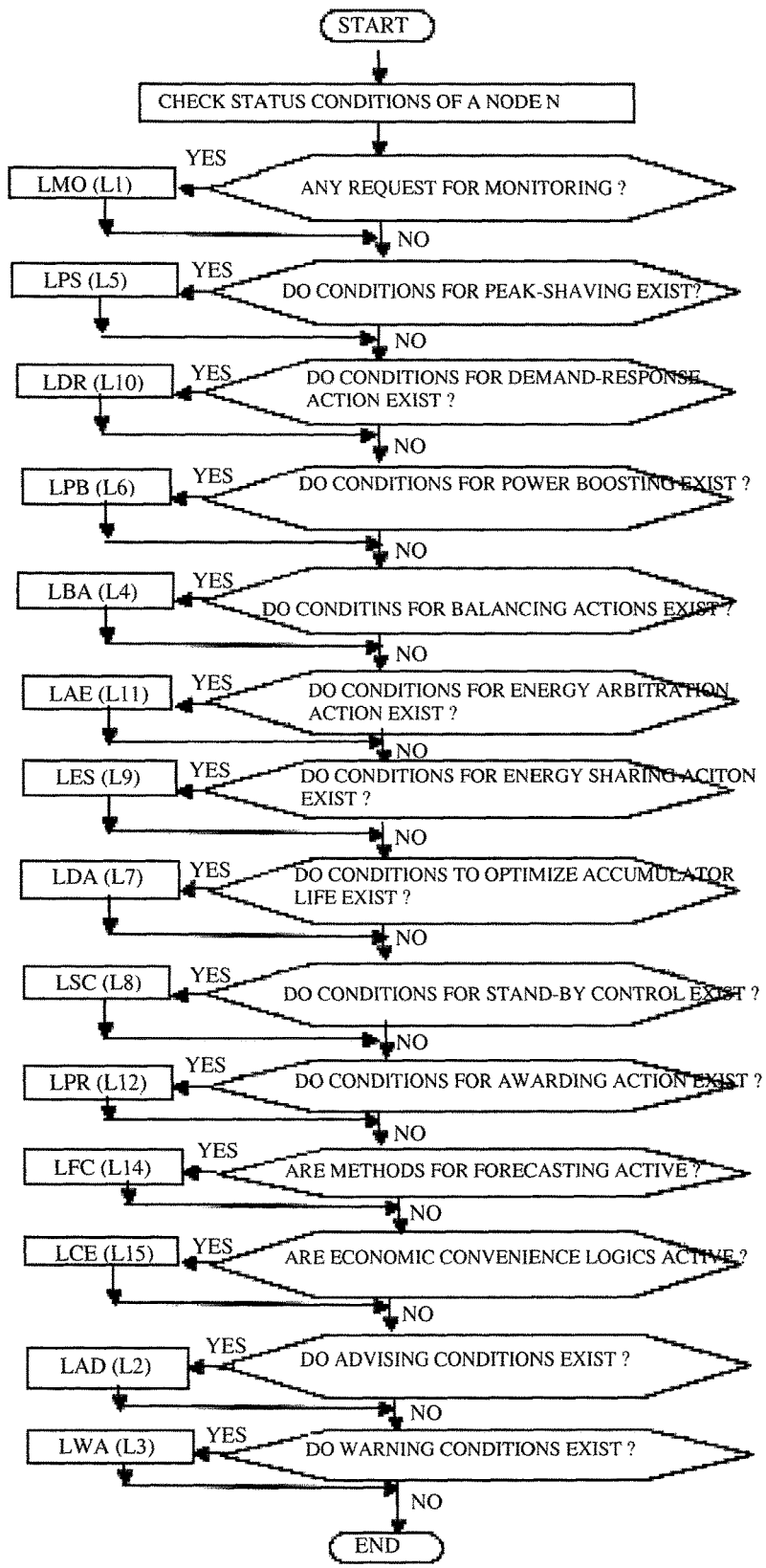

FIG. 6 is a simplified block diagram of the flowchart type, which graphically represents the intervention, in a progressive sequence, of management logics provided, here combined by way of non-limiting example only. In fact, logics can be in turn selected and combined in a specific sequence that is oriented to optimize one or more purposes of an energy community, also according to a degree of importance that determines the priority of intervention; to this end, an oriented combination of logics (CL1-CLn) dedicated to an energy community is pre-set, which is operational in the corresponding portion of the platform, to be shared by each node that is aggregated to the same community, also called node n.

Figures 7A, 7B:
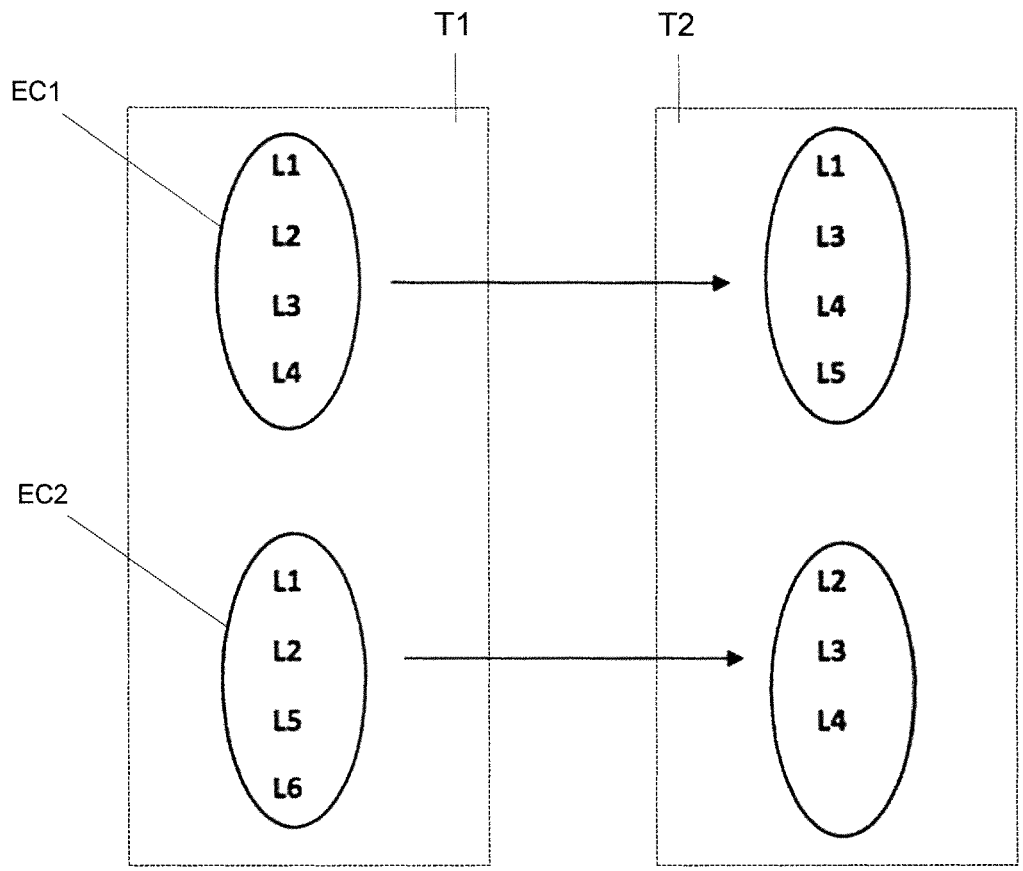

FIGS. 7a and 7b schematically represent, in the form of tables, two different combinations of logics within a first EC, called EC1, and a second EC, called EC2, which are dynamically variable over the time, by number and composition, being referred to a first time T1 and then to a subsequent time T2. It should be noted that, in a limit case of maximum differentiation, the proposed system allows to continuously differentiate each combination of logics, in each EC. In this example and in the following ones, the numbering of logics considered is random.

Figures 8A, 8B:
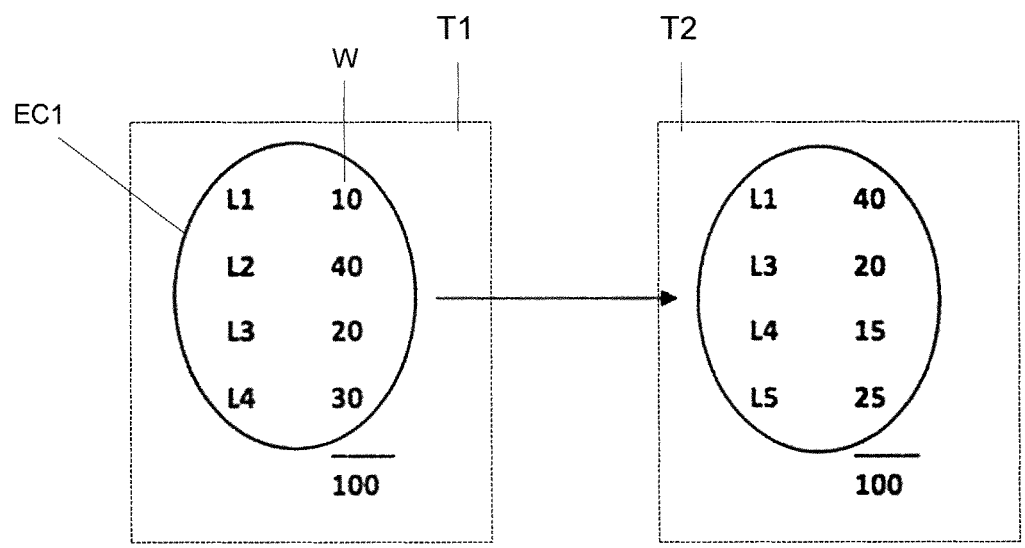

FIGS. 8a and 8b schematically represent, in the form of tables, a combination of logics weighed by relative dynamic priority of intervention, within an EC, called EC1, which combination of logics is referred to a first time T1 and a subsequent time T2 being variable over the time, and wherein to a greater degree of importance corresponds a greater priority of intervention, as in a weighed sequence. In these tables, by way of non-limiting example, said degree is assigned on a percentage priority.

Figures 9A, 9B:
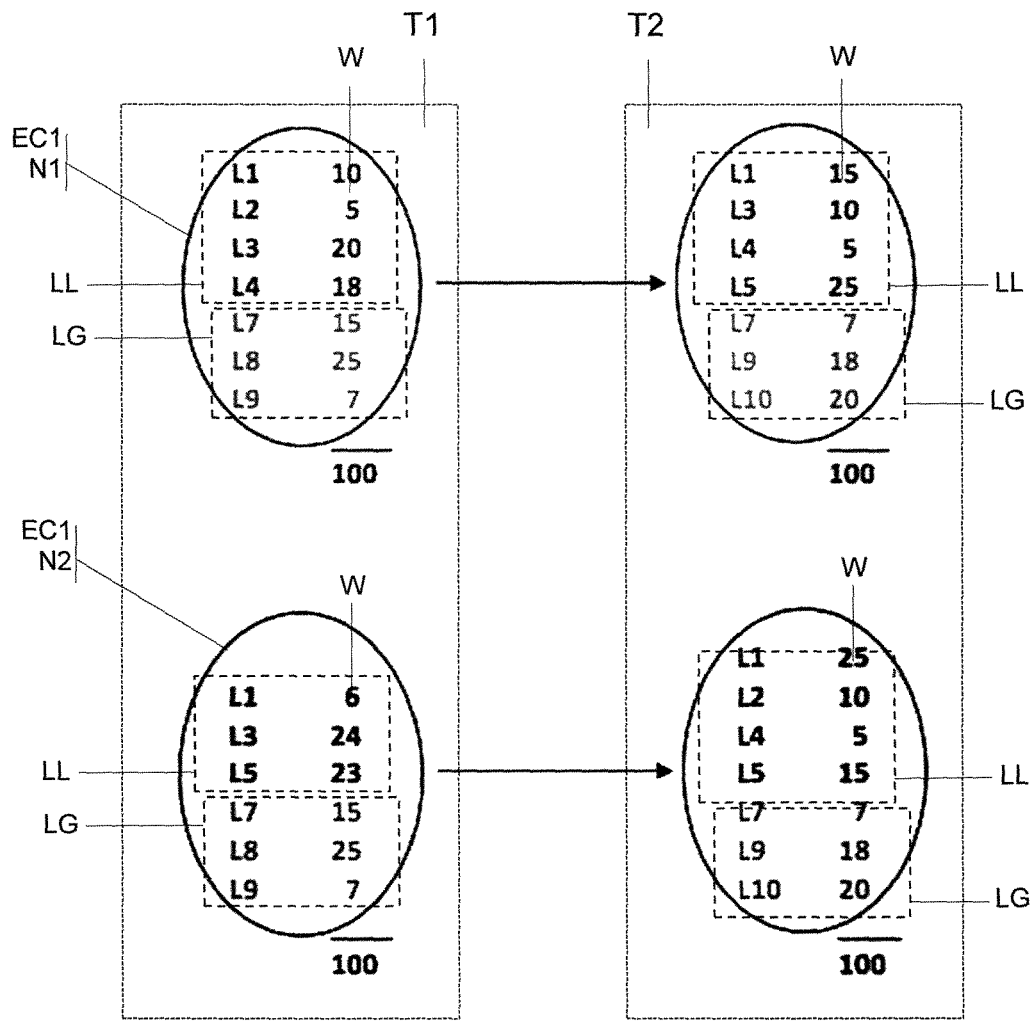

FIGS. 9a and 9b schematically represent, in the form of tables, two different combinations of logics within the same EC, called EC1, where a first combination refers to a first node N1 and a second combination refers to a second node N2, similarly referred to said first time T1 and to a subsequent time T2, wherein each combination includes customizable local logics, namely referred to the node, and noncustomizable group logics being referred to the EC and shared by all the participating nodes.

Figures 10A, 10B:
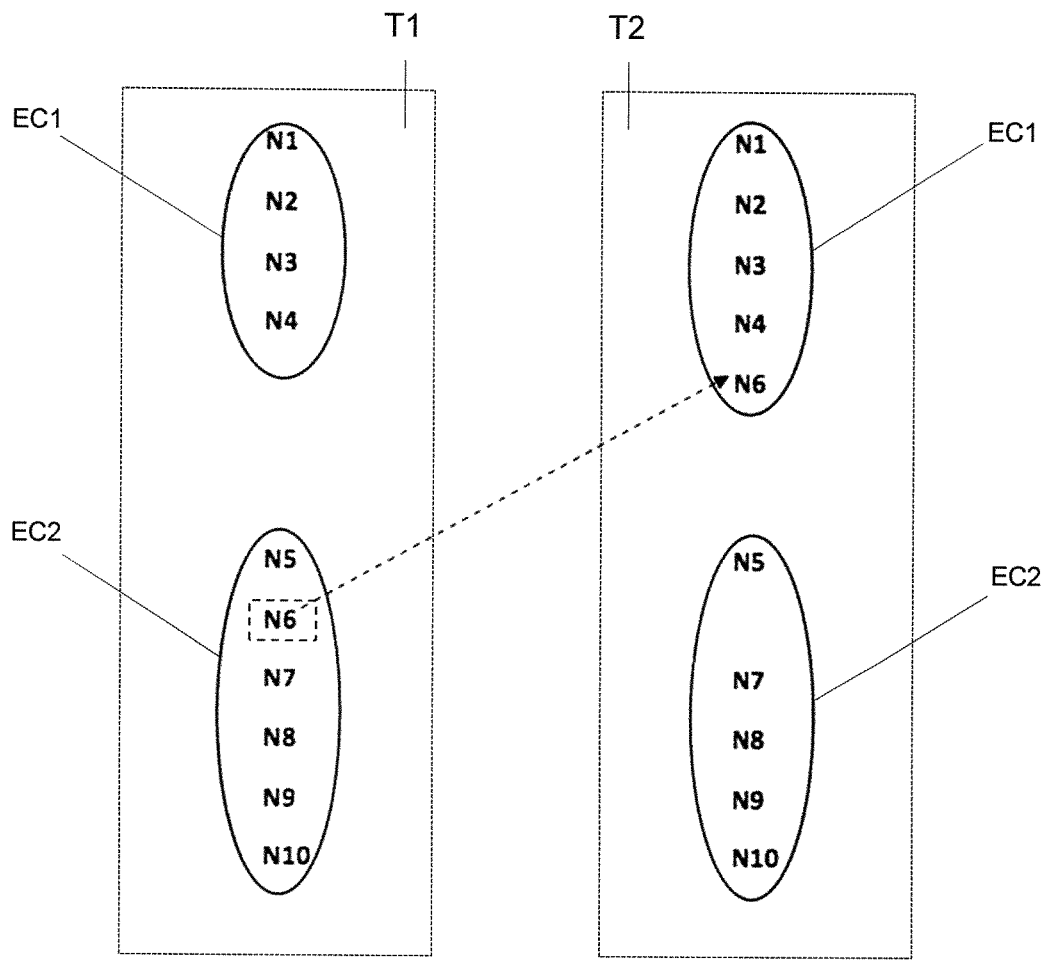

FIGS. 10a and 10b schematically represent, in the form of tables, two different combinations of logics within as many EC, a first EC called EC1 and a second EC called EC2, which combinations refer to a first time T1 and a subsequent time T2 being dynamically variable over the time, wherein an any user, i.e. the node N6, can at any time freely decide to change the EC to which it is aggregated.

DESCRIPTION OF AT LEAST ONE EMBODIMENT OF THE INVENTION

With reference also to the Figures (FIGS. 1-10), an advantageous adaptive system for managing, in an integrated way, energy communities with variable configuration (EC1-ECn) is described, consisting of users who produce and/or consume and/or accumulate energy, also called nodes (100), wherein at least two nodes are simultaneously aggregated as active nodes of an EC, while other nodes can aggregate to it as entering nodes or can abandon it as exiting nodes.

In particular, an EC according to the present invention consists of nodes (100) that are users of a same external, electrical or thermal energy or gas distribution grid (UT), generally a public grid or utility, and which have the following minimum requirements:
- have installed a smart node controller of the type called smart node control unit. By way of example only, refer to the node controller described in the above-mentioned document EP2917991 (Spotti) or the node controller called Snocu of the Italian company Regalgrid Europe S.r.l.—www.regalgrid.com—or a similar electronic apparatus that is able to manage all the active or passive devices included in a prosumer or proconstomer node, and also is able to locally apply the management logics provided by the present invention, in such a way as to perform a bi-directional exchange of energy according to the proposed adaptive system;
- have installed one or more meters of the type called smart meter, e.g. a MID-certified meter, interfaced with said node controller according to any of the available protocols, able to measure the variable concerning the consumption, which can be expressed in KWh if electrical energy, in Kcal if thermal energy or in cubic meters if gas;
- be authorized to the access an IT services platform (200) of the type called cloud service, through specific accreditation;
- have an Internet connection that allows said node controller (101) to connect in a bi-directional way to said IT services platform (200), as it includes programs for the management of said energy communities (EC1-ECn) and nodes (100) aggregated to them.

Said nodes (100) are preferably connected in low voltage, single phase or three phase, or even in different voltage, and can be equipped with one or more of the following devices (FIG. 1):
- electrical energy generators or exchangers, such as photovoltaic panels (103);
- solar (104) or hybrid inverters for the conversion of DC in AC or in the voltage for using an associated accumulator, such as a battery;
- electrical energy production meters (105);
- electrical energy accumulation devices (106);
- electrical vehicles recharging devices (107), which for example convert said current from AC to DC in such a way as to be correctly used to this purpose;
- heat generators or exchangers;
- thermal energy production meters;
- thermal energy accumulation devices and corresponding regulating devices;
- devices that consume electrical or thermal energy or gas, such as household appliances or boilers or air-conditioning devices. Generally, these devices are classified as primary loads (109) and excludable loads (110), and/or other loads (108), with also meters.
- electrical vehicles (112).

The management system proposed by the present invention simplifies the creation and management of energy communities (EC1-ECn) with variable configuration. It should be noted, in particular, that the aggregation perimeter of an energy community is substantially virtual as the aggregated nodes exchange energy through said external distribution grid (100) which is shared, without being directly interconnected one another, therefore it is possible to aggregate groups of physically close nodes but also very nodes far one another, thus defining an aggregation perimeter that is physically discontinuous. Therefore, the nodes aggregated to the same energy community share at least the aggregation conditions and the general purposes, an external distribution grid (100) and all information related to the single node with the above-mentioned devices, in such a way as to optimize in real time the management logics provided by the same energy community, as detailed below. It should also be noted that said aggregation perimeter is variable as it is defined depending on the nodes that aggregate in turn, to actively participate in said energy community (FIG. 2); said nodes (100) can be dynamically aggregated over the time, therefore in an energy community there are simultaneously active node and there can also be nodes entering and/or nodes exiting from said perimeter.

To the nodes that are included in the perimeter of an EC, and therefore actively participate in the exchange of energy and information, for example by sharing participation modes and/or economic conditions, the present invention applies the following logics of automatic management, conventionally called logics (L1-L15) (FIG. 6), which are in turn selected and ordered according to the specific energy community (EC1-ECn) considered:
- monitoring logics (L1), or LMO. They are always applied before the other logics (L2-L15), being preparatory to every operation and/or calculation;
- advising logics (L2), or LAD;
- waning logics (L3), or LWA;
- balancing logics (L4), or LBA;
- peak-shaving logics (L5), or LPS;
- power boost logics (L6), or LPB;
- maximization of accumulator life logics (L7), or LDA;
- standby control logics (L8), or LSC;
- energy sharing logics (L9), or LES;
- demand-response logics (L10), or LDR;
- energy arbitration logics (L11), or LAE;
- rewarding logics (L12), or LPR;
- machine learning logics (L13), or LML;
- predictive logics (L14), or LFC;
- cost effectiveness logics (L15), or LCE;

said logics (L1-L15) are described in detail below.

In general, all or only some of the aforementioned logics (L1-L15) are firstly applied at a group level (LG) (FIGS. 9a-9b), namely implemented in primis by said energy community (EC1-ECn) which therefore represents the first user and beneficiary of the proposed management system, and then only some of said logics (L1-L15) can be applied at local level (LL) (FIGS. 9a-9b), namely implemented by one or more active nodes of the same energy community, in addition to the other logics (LG). The proposed management system mainly obtains advantages that are shared at a group level; moreover, it accumulates, disciplines and locally distributes, according to an ordered sequence of configurable and parameterizable logics, said advantages accrued at a group level. It should be noted that these advantages are economical, energetic or in terms of use of the service, and can be locally distributed to the single members of said energy community, namely said nodes, or to third parties which are pre-set or established in turn as it happens for example in the case of bidding, or to other energy communities.

More in operational detail of the proposed management system, it is envisaged that each node (100) is connected to said energy distribution grid (UT) for a bi-directional exchange of electrical or thermal energy or gas, and has installed at least one meter of the smart type (102) which is able to measure these energy variables entering and exiting said distribution grid, such as a smart meter according to the European MID standard, and which interfaces with said node controller (101) to share the information required to manage of the entire energy community and its node. Each node (100), therefore, has an Internet connection that allows said node controller (101) to connect in a bi-directional way to an IT services platform (200) of the type called cloud service, which includes programs for the management of said energy communities (EC1-ECn) and wherein, in particular, the aforementioned logics (L1-L15) are included.

According to the purposes of the invention, said IT services platform (200, L1-L15) is advantageously partitionable depending on a specific energy community, providing platform portions (200/1-200/n) corresponding to said aggregation of nodes (100), namely providing a portion assigned to each energy community (EC1-ECn), where in each portion said community logics (L1-L15) are in turn re-combined and ordered in a specific oriented combination (CL1-CLn), namely selected and parameterized in a differentiated way, according to the optimization purposes provided for each energy community. Each oriented combination (CL1-CLn) of logics corresponds to a weighed sequence that is implemented to the single aggregated node, where every logic adopted by the energy community and/or its aggregated node is assigned a diversified degree (W).

Each oriented combination (CL1-CLn) is made available and active, in a mode called cloud processing, in one of said platform portions (200/1-200/n), to be used and possibly customized (LL) by the nodes (100) that are connected to it, namely aggregated to the corresponding energy community (200/1, EC1, CL1) (200/n, ECn, CLn). In this way, it is easier to create and manage an energy community independently from the management of other aggregations, where a third party called Service Provider (SP1-SPn) can create and manage a new energy community (EC1-ECn) by activating an oriented combination of logics (CL1-CLn) corresponding to the same, and then giving to each entering node (100) the authorization to aggregate. Consequently, it can connect upon authorized accreditation to the corresponding platform portions (200/1-200/n) where said combination (CL1-CLn) is active in cloud processing mode, which is shared by all the nodes (100) aggregated to the same energy community (EC1-ECn) and is also partially customizable in such a way as to locally optimize (LL, W) the advantages provided for the group (LG, W), according to specific purposes or advantages required for its own node.

Each oriented combination (CL1-CLn, LG, W) is prevailing as regards said internal management programs (LL, W) of a node (100), which implements the commands imparted by the combination of logics to said devices for the production, accumulation and/or consumption of energy, by means of said node controller (101) that continuously reads and sends data about its own node according to at least one monitoring logic, receives said commands and consequently checks said devices, thus actively participating in the management of an EC.

In particular, the management system proposed for energy communities EC (EC1-ECn) with variable configuration is fast and integrated, with said management logics (L1-L15) being made available in an IT platform (200) which is partitionable (200/1-200/n), where they are in turn re-combined in an oriented combination (CL1-CLn) of logics activated in cloud processing mode; each platform portion (200/1-200/n) corresponds to a specific EC and a specific oriented combination. In particular, said logics (L1-L15) are made available in said digital platform (200) in a neutral form, namely not selected, not sequenced and not parametrized, by a technology-platform provider (TPP) that manages the entire digital platform (200, L1-L15) at an upper level, that is at system level, as master. Said logics (L1-L5), therefore, at an intermediate level of the digital platform (200), namely in correspondence of said platform portion (200/1-200/n, EC1-ECn), are in turn selected, sequenced and parametrized as oriented combinations (CL1-CLn), depending on the optimization purposes provided for each EC (EC1-ECn).

Operationally, said oriented combinations (CL1-CLn) of logics are continuously recalculated, namely within 50 milliseconds from the reading of the data of each node, thus adapting in real time to its variable configuration and to that of all the other aggregated nodes. In this way it is possible, at said upper level or master, to centralize the information of all energy communities EC (EC1-ECn) for example for analytical, statistical or control purposes, compliant to privacy regulations, and also third parties, such as said service providers (SP1-SPn) or aggregation administrators, at an intermediate or community level, are helped in the creation and/or separate management of an unlimited number of EC with configuration variable (EC1-ECn), each with its own purposes and participation modes (CL1-CLn). Moreover, at a lower level of use, namely at node level, it is possible for any user that is equipped with said energy production, accumulation and/or consumption devices, which can possibly be modifiable, and that has previously signed up or is pre-accredited in said IT platform (200) (FIGS. 2-5), to enter or exit, with an extreme operational freedom, in/from said aggregation perimeter of an EC with configuration variable, as the perimeter is substantially virtual, by using the same controller and the same interface devices. This system integration, like energy macro-community, is not available nowadays and is increasingly required by the free market of energy supply, wherein the above-mentioned variability of aggregation can occur frequently, depending on particular economic or energetic purposes or other purposes, such as when a service provider (SP1-SPn) creates a new energy community (EC1-ECn) that offers more advantageous energy distribution conditions for specific time slots or more advantageous invoicing conditions or other advantages and promotions.

Therefore, in said macro-community of energy nodes (100) pre-accredited at said upper level of the digital platform (200, TPP), each single node (100) is independent and free to aggregate, at any time, to any EC (EC1-ECn), entering and exiting from a platform portion (200/1-200/*n*) corresponding to the same, by means of the same controller (101) and the same wirings, the same connections and the same programs, by means of which it (100) can, through said digital platform (200), request the change of EC (EC1-ECn) and automatically receive, from the aggregation administrator or service provider (SPn-SP1), additional IT integrations that allow it to automatically aggregate as an active node. These IT integrations include at least one accreditation that gives direct access to the corresponding platform portion (200/1-200/*n*, EC1-ECn) and to the corresponding oriented combination (CL1-CLn), it being automatically operational, in cloud processing mode, to be shared by all the controllers (101) of the nodes (100) that are temporarily aggregated to said EC (EC1-ECn).

Furthermore, from an operational and functional point of view, the proposed management system achieves the relevant advantage, as regards the known and conventional solutions for managing energy flows between users grouped in networks and/or community, of allowing the simultaneous implementation and coexistence of different configurable and parametric management logics, within a section of a partitionable IT platform that operates in cloud processing mode.

Moreover, with the proposed system, said ordered combinations of logics described above are easily re-calculated for the entire EC in real time, here operationally intended as a time equal to or lower than 50 milliseconds from the reading of the data of each node belonging, at that moment, to its perimeter. The implementation of the single commands imparted to the single devices of the node occurs by means of the node controller (101), which is of smart type and suitable for the bi-directional communication such as, for example, said node controller called Snocu.

With the proposed management system, therefore, each node controller (101) plays an active role as regards the energy assets of the entire EC. In the event said node controller (101) temporary fails to connect to the Internet, the node proceeds according to local optimization logics with pre-set node algorithms, according to energy exchange dynamics, also called stand-alone or one-to-one, though still being connected to the external power grid. Essentially, the participation of that node in the logics and dynamics of the EC is expected to be suspended until a later connection; then, for data logging and reporting purposes, the same node controller (101) stores in a local memory the data concerning energy behaviours of the single node, in such a way that when it will re-connect, they will be transmitted to the servers (113) of the digital platform (200).

The proposed management solution provides that traceability, accounting and final balancing of the performances generated and accrued by an EC, are carried out according to techniques and practices that can use conventional or even more advances technologies, such as the technology called blockchain or other. Moreover, the different reporting, logging, invoicing and data analysis activities can be performed as typical services implementable according to existing methods and regulations.

More in detail of said management logics (L1-L15), the monitoring logics (L1), or LMO, provide for monitoring at least one performance and/or a level. The monitoring of performances occurs for a selected period of time, for example by day, week, month, year or fraction thereof, with reference to:

flow quantities, such as energy produced, energy consumed, accumulator charge/discharge cycles, self-consumption, self-sufficiency, accrued savings, economical balance as regards to a selected pricing plan or other;

and/or instantaneous status quantities, such as instantaneous power demanded from the external grid, batteries soc intended as acronym of state of charge, self-consumption, self-sufficiency or other.

The monitoring of the level, instead, refers to:

single user, as an absolute value;

and/or single user compared to a reference value, like a target, which is calculated based on the equipment the node in question is provided with, through an algorithm based on the configuration of the devices of the single node;

and/or single user compared to a significant reference period, like a target, where for example the monthly performances are compared to the previous month or the same month of the previous year;

and/or single user compared to average aggregate of the performances of the energy community to which it belongs, in such a way as to understand if the node is the best performer within the community or in the average or sub-performing;

and/or energy community, considered at a level of average aggregate of the performances of the nodes composing that energy community to which the node belongs to, as regards to other communities identified within a given radius of kilometric distance. Essentially, in that case, if there are no other communities in that radius, an algorithm still calculates the average of the performances of the nodes having said node controller of the Smart Node Control Unit type, with license to participate in said energy community, and compares it as a virtual comparison aggregation.

From the monitoring described above originate suggestions and recommendations to the single user and/or the manager of an EC, according to a special set of algorithms called advising logics (L2), or LAD, which provide operational instructions useful to improve the performances of the single active node and EC to which it is aggregated. Among them, there are the following purposes:

suggest to clean photovoltaic panels if power output is lower than rated power by a given percentage value, such as 5%, and for a specific period of time, for example greater than 10 days;

advise the time shift of some consumptions if the value of self-consumption is lower than a reference value, or target, pre-set by a specific algorithm for calculating a self-consumption target, according to the geographical position of the node and its hardware configuration, considering at least the rated power installed and a rated accumulation value, and/or considering an estimate on a statistical basis of consumptions as a historical average;

advise the implementation of power boost logics (L6), if exceeding pre-set energy consumption thresholds;

advise the implementation of automatic charge/discharge cycles in order to increase the remaining life of the accumulators;

giving useful instructions to the economic balance of a single node or the entire EC, in case energy arbitration logics (L11) towards the external grid are possible, by purchasing and selling energy when the hourly rate is advantageous;

advise the node to add accumulation elements, also providing simulation tools for calculating the convenience and the expected performances according to their sizing;

advise the node to add generators, such as photovoltaic panels, also providing simulation tools for calculating the convenience and the expected performances according to their sizing;

report abnormal or winning energy behaviours as regards similar periods in previous years;

report abnormal or winning energy behaviours to node as regards the EC to which it belongs;

report abnormal or winning energy behaviours of the EC to which you belong, as regards similar periods of previous years;

report abnormal or winning energy behaviours of the EC to which you belong, as regards to other neighbouring or virtual EC.

Said warning logics (L3), or LWA, are conceived in such a way that, based on specific calculation algorithms and according to the configuration of devices in a single node, if specific conditions occurs, some checks are required:

check of generators, such as when the power output is lower than rated power for a value equal to 10% and for a period of more than 20 days;

check of inverters, such as when a disconnection occurs more than once in a day;

check of the Internet connection of the node controller, e such as when a disconnection occurs more than twice in two days;

and/or warnings are given:

warning when measuring consumption, generation or self-consumption quantities that are greater or lower than a given percentage value, as regards pre-calculated reference values;

warning when measuring, in an energy accumulator or battery, a charge lower, by a given percentage value, than its pre-set minimum value, also called soc min, which is a pre-alarm threshold as regards the minimum nominal value defined by the manufacturer;

warning when measuring, in an energy accumulator, a charge higher, by a given percentage value, than its pre-set maximum value, also called soc max, which is a pre-alarm threshold as regards the maximum nominal value defined by the manufacturer.

With said balancing logics (L4), or LBA, it is possible to pilot the energy behaviour of an EC for the purpose of obtaining the maximum self-balancing, providing at least one native self-balancing logic suitable to maximize self-sufficiency as regards the external grid. Such a logic shall, therefore, be configured with precision as regards hardware devices with which the single nodes are equipped, in particular generators and accumulators, depending on the peaks and measurements of consumption considered within all the nodes that are simultaneously aggregated. Furthermore, it should be noted that such a logic can be administered according to specific purposes, other than those that are mentioned above, such as keeping an energy reserve that can be supplied to the external grid operator in case of request, or keep an increasing or lowering energy reserve to sell or put in a local grid included in an EC, for a given period of time, due to a specific need and request from the external grid operator.

Such alternative logics are easily implementable by means of said digital platform (200), where they can also be integrated subsequently as regards the initial installation, providing that all or part of devices that constitute the equipment of the single nodes of an EC are configurable in a parametric way, with the values required to obtain the desired reserves. Therefore, if during standard operation of the single nodes of an EC, specific and pre-set request codes are received via said digital platform (200), which are transmitted by the external grid operator or by the system provider that administers the system at an upper level or by the service provider that administers said EC at an intermediate level, LBA logics are implemented, which are different than said native logics suitable to maximize self-sufficiency.

Said peak-shaving logics (L5) or LPS, allow to unintentionally exceed, within the same node, a power threshold which is pre-set by contract or for a specific equipment configuration; the invention provides that this overcoming is opportunely balanced using the energy reserve that characterizes the node, based on its energy storage devices, or using the energy reserve of appropriately selected neighbouring nodes, according to an optimization algorithm for community peak-shaving.

Then, within the single node, by means of said digital platform (200) and with a user application or a user portal, it is possible to modify the use profile of energy consumed by implementing power boost logics (L6), or LPB, on the basis of which the node in question becomes intentionally more energy consuming than normally configured for a given schedulable period. Said power boost logics will then perform guided accumulation discharges of the node and of the neighbouring nodes in order to meet this need, preserving as much as possible the target purposes that underlie the community.

Said maximization of accumulator life logics (L7), or LDA, are provided to maximize the residual life of the accumulators of the single nodes of an EC, and consequently the residual life of the aggregated accumulators of the energy community as a whole, being specific and dedicated logics that perform, by rotation and according to a pre-set schedule, forced and guided cycles of full discharge and full charge of the single accumulators, then keeping them then charged and inactive for a given period of time. This behaviour helps to extend the residual life of each single accumulator and in conclusion the residual life of the accumulation capacity of an EC as a whole. During the forced discharge and charge cycle of a single accumulator, that node will use the accumulation capacity supplied by the remaining EC. Such cycles can be activated or deactivated according to local or remote logics.

Said standby control logics (L8), or LSC, are provided in the case a user wishes to make sure that he has no residue consumption, such as it occurs in given periods of the year for second houses that are not used. In such cases, with the management system provided by the invention, by means of said digital platform (200) and a user application or user portal, through a node controller is easily possible to remotely deactivate the different pre-set charges. As a result, the status information for that node will be managed in real time from said digital platform (200) in such a way that all the nodes of an EC may adapt, thus locally acting according to the shared advantages of EC.

The invention provides that an EC can pursue multiple advantages both at group and local level, also combining and sequencing multiple parametric and configurable logics, as described in detail below. Therefore, an adaptive system is provided, which is able to manage energy exchanges in an EC also considering said variability of purposes, by implementing energy sharing logics (L9) or LES, among the different nodes composing the same. In particular, it is possible to integrate and implement, in all the nodes of an EC, programs which are already known, in order to maximize the advantages at a node level, such as the routine and sub-routine of said document EP2917991 (Spotti), being now considered not with a one-to-one dynamic, but at prevailing advantage of the EC, according to a pre-set priority tree based on:

system configurations of the single nodes, established by means of said digital platform (200) with a user application or user portal:
ongoing balancing logics (L4);
possible ongoing peak-shaving logics (L5);
possible ongoing power boost logics (L6);
possible ongoing maximization of accumulator life logics (L7);
ongoing demand-response logics (L10);
ongoing energy arbitration logics (L11).

An EC may sometimes receive special requests from the grid operator or from energy trading platforms affiliated according to pre-agreed modes; generally, such requests require the availability to put or draw off some quantities of energy, for a given period of time, from the external grid to said EC and vice-versa. Such requests occur according to a pre-set and pre-agreed communication pattern and conditions, through specific demand-response logics (L10), or LDR. Moreover, each single node or the entire EC can activate, according to the current regulations in force in the country, specific energy arbitration logics (L11) and therefore, based on the reference pricing agreement, buy or to sell energy from/to the external grid when an economical advantage is obtained for the single node or for the entire community.

Said awarding logics (L12), or LPR, are conceived in such a way that, within an EC, specific energy behaviours may be established, such as investments in renewable generation and/or accumulation, or period performances that can accrue bonuses; by way of example, consider bonuses quantifiable in KWh or in currency or other advantages. Said bonuses being assignable according to pre-set awarding logics or defined ex post according to machine learning logics (L13). The LPR logics can be implemented to single nodes or to the energy community as a whole in order to achieve periodical or occasional pre-set purposes. The aim of these awards is to:

highlight and emphasize energy behaviours that are particularly virtuous and advantageous
be an example for the other members of the energy community
orientate towards continuous improvement
establish a positive competition among participants in a community and among communities.

Said machine learning logics (L13), or LML, depending on the acquisition and logging of energy behaviour data of the single nodes, allow to implement more effective forecasts or comparisons at a level of:

LMO logics (L1), for example as compared to performance of similar periods, or neighbouring nodes, or contiguous EC or other comparisons;
LDA logics (L7);
LBA logics (L4);
LES logics (L9);
an algorithm for calculating target self-consumption of a node or an EC.

The energy behaviour dynamics of an EC, according to the present invention, can thus be established by means of the above-described logics, and can also be optimized combining specific predictive logics (L14), or LFC, which can foresee specific generation or consumption scenarios for the purpose of facilitating real-time calculations and/or allowing best strategic choices. Among the input elements for such predictive logics there can be:

preliminary determination of the generation, such as in case of photovoltaic generators, by analysing in advance the weather and radiation forecasts for the area concerned;
preliminary or scheduled determination of consumption curves of the EC;
preliminary or scheduled determination of the state of charge of the accumulators of the EC;
preliminary or scheduled determination of price changings of the reference external grid.

In this way, while maintaining an extremely high reactivity of the system where readings are essentially carried out in real time, namely with reading times of the new conditions equal to or lower than 50 ms, the system can act in advance based on the LFC logics (L14) implemented. It should also be noted that the reading of actual performances, thanks to the LML logics (L13), allows an ever-greater precision of said LFC logics (L14).

Furthermore, the economic convenience logics (L15) or LCE, allow to control the situations of greater or lesser economic convenience when managing the energy behaviour of an EC; they are defined or scheduled preferably depending on the following parameters:

pricing plan for the active nodes of an EC;
active capacity market services;
secondary dispatching market available;
balancing or charges resulting from imbalance;
specific regulation of that EC, such as in the specific case of an electrical block of flats according to the local regulations.

It should also be noted that the advantageous proposed management system allows to implement some logics, such as LDR, LAE, LPR, LCE, to the different EC of said digital platform (200, 200/1-200/n) since the beginning, namely at the installation and sign up of the nodes, or at any later time, since they can be activated remotely via software upon commercial agreements and configuration of the corresponding logics, and this occurs without modifying anything in the hardware installation of the single nodes. In such cases or similar other cases, it is also possible to parametrically configure specific purposes that can be achieved by an EC, like target functions.

Advantageously, it is expected that in an EC there may be logics that are the same for all the aggregated nodes (FIGS. 7*a*-7*b*), and with the same degree (W) if considered at the same moment (T1, T2); each combination of logics (L1-L15) can be dynamically variable over the time, by number and composition, and can be differentiated, at the most, for each energy community (EC). In the aforementioned Figures, two energy communities (EC1, EC2) are considered, which are represented in two different moments (T1, T2), where the combination of logics included in each of them (EC1, EC2) in a first moment (T1) is different from the corresponding combination of logics in the same energy community (EC1, EC2) in a second moment (T2).

More in detail, instead, of a second advantageous characteristic of the invention (FIGS. 8*a*-8*b*), it is foreseen that said combination of logics is sequenced by relative dynamic priority of intervention within the same energy community; essentially, a greater degree of importance corresponds to a higher intervention priority. In the aforementioned Figures, the same energy community (EC1) is considered, which is represented in two different moments (T1, T2), where every logic adopted is assigned a weight, also called degree (W), for example on a percentage basis, which can be different from a first moment (T1) to a second moment (T2) as the corresponding combination of logics (L1-L4, T1) (L1 and L3-L5, T2) is different for a different expected purpose.

Furthermore, a third advantageous characteristic of the invention (FIGS. 9a-9b) provides a particular combination of logics with local logics (LL) implementable in a customized way to the single node, in addition to and as a result of group logics (LG) that are shared and implemented as such in the entire energy community. Among the possible local logics (LL) implementable at the level of a single node (100), by a user, it is possible to mention by way of example only: said LPB logics (L6), said LDA logics (L7), said LSC logics (L8). Among said group logics (LG), implementable at a level of EC (EC1-ECn), it is possible to mention by way of example only said LAE logics (L11), said LBA logics (L4), said LPS logics (L5), said LDR logics (110), said LAD logics (L2), said LWA logics (L3), said LPR logics (L12). Moreover, logics which may be activated either locally at a node level (LL), upon request from a single user, or at a group level (LG) being activated by the manager of the EC, such as propaedeutic LMO logics (L1), said LES logics (L9), said LCE logics (L15), said LDA logics (L7) or other possible logics, are provided.

Consequently, each customizable local logic (LL) or group logic (LG) has, per each energy community, a degree (W) set at the installation and dynamically variable over the time, which determines the corresponding priority of intervention as regards the other logics, in such a way as to order them according to a weighed sequence which is constantly updated according to the above-mentioned variable and customizable configuration. In the aforementioned Figures (FIGS. 9a-9b), two different nodes (N1, N2) of the same energy community (EC1) are considered, which are represented in two different moments (T1, T2), where group logics (LG) in the two nodes are identical one another and have the same degree (W) if considered at the same moment (T1, T2); the local logics (LL), instead, are always different and with different weights in the two nodes (N1, N2) and in the two moments (T1, T2), as they refer to the customization of a specific user, which can as well change in purpose.

More in detail, instead, of a fourth advantageous characteristic of the invention (FIGS. 10a-10b), it is provided that a node (N6), namely any user at any moment (T1), can chose to change its membership from one energy community (EC2, T1) to another (EC1, T2), without having to re-install hardware or software in its own node controller. The user (N6), being already member of the above-mentioned IT platform where the logic aforementioned of management (L1-L15) are included in cloud service mode, shall only be accredited to participate in a new energy community (EC2).

REFERENCE (100) node that produces and/or consumes and/or accumulates energy, also called prosumer and/or proconstomer and/or constorer node, which has signed up in a partitionable digital platform, as provided by the present invention. Said node is dynamically aggregated over the time to an energy community and also can change its own energy assets;

(101) node controller of the smart type, for bi-directional communication of information and commands. Refer, by way of example, to the device of the gateway type called Snocu, Smart Node Control Unit, of the Italian company Regal Grid S.r.l.—www.regalgrid.com, which allows a remote or direct control of all the energy assets of an energy node of the prosumer and/or proconstomer and/or constorer type, and also allows to connect, via the Internet, to a software cloud platform that allows to manage an energy community of nodes connected to an external energy distribution grid, in order to manage energy exchanges between the nodes;

(102) meter of the smart type, able to measure the energy variables entering and exiting a distribution grid. It is a device of the Smart meter type, for example pursuant to the European MID standard, which is interfaced to said node controller to share the information required for managing the energy community and its own node;

(103) electrical energy generators or exchangers, for example photovoltaic panels;

(104) solar or hybrid inverter, for example a solar inverter combined to a battery charger device in such a way as to serve both as inverter, to convert DC into AC, and battery charger;

(105) production meters;

(106) electrical energy accumulation devices;

(107) electric vehicle charging device;

(108) devices that consume electrical or thermal energy or gas;

(109) primary loads;

(110) secondary or excludable loads;

(112) electrical vehicles;

(113) remote server, serving the digital platform;

(200) digital platform. IT services platform of the partitionable type, as provided by the invention, operating in cloud service mode;

(200/1-200/n) digital platform portion, corresponding to an EC, in a potentially unlimited number as provided by the proposed management system;

(CL1-CLn) oriented combination of logics, for the optimized management of an EC with configuration variable;

(EC) acronym of energy community. In the present invention, EC means an energy community with variable configuration;

(EC1-ECn) energy communities with variable configuration, in a potentially unlimited number, as provided by the proposed management system;

(L1-L15) management logics, which are re-combinable and orderable;

(LG) group level;

(LL) local level;

(SP1-SPn) Service Provider, or aggregation administrator, that manages an EC with configuration variable, the ordered combination of logics that is implemented in the same and the platform portion where it operates at an intermediate level;

(TPP) Technology-Platform Provider, or administration of system, that manages at an upper level, as master, the digital platform provided by the invention;

(UT) external electrical or thermal energy or gas distribution grid, generally a public grid or utility.

The invention claimed is:

1. A system for managing an energy community, the energy community being users that produce energy or consume energy or accumulate energy, the system comprising:
a plurality of nodes wherein each of said plurality of nodes has a device selected from the group consisting of an electrical energy generator, an electrical energy exchanger, a solar inverter, a hybrid inverter for DC-to-AC energy conversion, a battery charger, a production meter, an electrical energy consumption meter, an electrical energy accumulator, a heat generator, a heat exchanger, a thermal energy production meter, a thermal energy accumulation device, a device that consumes electrical energy, a device that consumes thermal energy, a device that consumes gas energy, an electrical vehicle, a device for charging an electrical vehicle, and combinations thereof, wherein each node of said plurality of nodes uses an external electrical energy grid and is connected to the external electrical energy grid so as to allow a bi-directional exchange of energy;

at least one smart meter in which said plurality of nodes is installed, said least one smart meter being adapted to measure variables entering and exiting the external electrical energy grid;

a node controller interfaced with said least one smart meter, each node of said plurality of nodes having an internet connection that allows said node controller to bidirectionally connect a digital platform, the digital platform operating in a cloud service mode and having programming and shared logics for managing the electrical community, wherein said plurality of nodes are dynamically aggregated over time with at least two nodes of said plurality of nodes being simultaneously active, wherein said plurality of nodes aggregate autonomously with centering nodes of said plurality of nodes or abandon as exiting nodes of said plurality of nodes, said plurality of nodes having a variable configuration so as to dynamically modify a status of the device over time, the digital platform being partitionable so as to be managed at an upper level or a system level by a technology-platform provider that acts as a master, the energy community being operational at an intermediate level, wherein the digital platform is partitionable in multiple platform portions each corresponding to the energy community and to an oriented combination of management logics, the management logics being selected and sequenced and parameterized by the energy community; and a service provider being an aggregation accumulator at the intermediate level of the digital platform, said service provider being enabled by the technology-platform provider so as to activate and control the energy community by a corresponding platform portion, said service provider being activated in an oriented combination by the management logics.

2. The system of claim 1, wherein the energy community is a plurality of energy communities, wherein the digital platform pre-accredits and monitors the plurality of energy communities at the upper level by the technology-platform provider, each node of said plurality of nodes being independent and free so as to aggregate the energy community of the plurality of energy communities by entering into and exiting from a platform portion of the multiple platform portions by said node controller.

3. The system of claim 1, wherein the oriented combinations are implementable at a group level so as to be shared by the energy community in a group logic, the group logic being at least one of advising logics (LAD), warning logics (LWA), balancing logics (LBA), peak-shaving logics (LPS), energy abritration logics (LAE), and rewarding logics (LPR), the energy community having a local logic, the local logic being at least one of power boost logics (LPB), accumulator life logics (LDA) and standby control logics (LSC), wherein at least some of the group logic or local logic are activatable at a node level upon request of a single user or at a group level, each of the logics of the group logic and the local logic has a degree that is configured upon installation and is dynamically variable over time.

4. The system of claim 1, further comprising:
at least one advising logics directed toward providing instruction to at least one node of said plurality of nodes and to the energy community to which the node is aggregated, the at lease one advising logics providing the instruction selected from the group consisting of at least one of (a) cleaning photovoltaic panels when a power output is less than a reference value for a given period of time, (b) temporarily shifting consumptions if a consumption value is less than a reference value for the consumption, (c) applying power boost logics where consumed power exceeds a threshold of consumed power, (d) advising charge cycle or a discharge cycle of the accumulator, (e) giving instructions for an economical balance of a single node of said plurality of nodes or entire energy community, (f) advising one of the plurality of nodes to add an accumulation element, (g) advising the node to add a generator, (h) reporting anomalous energy behavior or proper energy behavior, and (i) reporting the node anomalous energy behavior or proper energy behavior.

5. The system of claim 1, further comprising:
at least one warning logics adapted to provide an alarm to the node of said plurality of nodes, the at least one warning logics selected from the group consisting of (a) warning to a generator wherein a power output is 2% lower than the rated power for more than two days, (b) warning of a disconnection of an inverter for more than once in a day, (c) warning of a disconnection of the internet connection of said node controller for more than twice in two days, (d) warning of a detection of a consumption or generation or self-consumption quantity that is out-of-tolerance with respect to a pre-calculated reference value, (e) warning of maximum state of charge in an accumulator that is lower a nominal value thereof at a pre-set percentage value, and (f) warning of a maximum state of charge in the accumulator that is greater than the nominal value thereof at a pre-set percentage value.

6. The system of claim 1, further comprising:
at least one balancing logics adapted to control at least one generator or at least one accumulator of each node of said plurality of nodes depending on a peak consumption and an average consumption so as to obtain at least one of (a) a maximum self-balancing by maximizing self-sufficiency from the external electrical energy grid, (b) keeping a charge reserve to be supplied to external electrical energy grid operator, and (c) keeping an increasing energy reserve or a lowering energy reserve for entry into the external electrical energy grid of the energy community for a given period of time.

7. The system of claim 1, further comprising:
a peak-shaving logics adapted to use a charge reserve so as to avoid exceeding a pre-set power threshold when one node of said plurality of nodes exceeds the pre-set power threshold.

8. The system of claim 1, further comprising:
a power boost logics adapted to execute guided discharges of energy accumulated in at least one node of said plurality of nodes and a node adjacent thereto upon a request for energy.

9. The system of claim 1, further comprising:
a maximization of accumulator life logics adapted to force and guide cycles of full discharge and full recharge of an individual accumulator of each node of said plurality of nodes of an energy accumulator.

10. The system of claim 1, further comprising:
a standby control logics implemented in the energy community so as to change a configuration when a user deactivates all pre-set loads of the node through this digital platform.

11. The system of claim 1, further comprising:
an energy sharing logics adapted to implement progress to said plurality of nodes of the energy community.

12. The system of claim 1, further comprising:
a demand-response logics defining a communication pattern in the energy community, said demand-response logics managing specific requests received from the service provider or from an external entity.

13. The system of claim 1, further comprising:
an energy arbitration logics adapted to purchase or sell energy from the external electrical energy grid base on a reference pricing agreement of the energy community, said energy arbitration logics being activatable from said plurality of nodes or from the energy community.

14. The system of claim 1, further comprising:
a rewarding logics adapted to assign a reward to the energy community or to a node of said plurality of nodes upon reacting a pre-set target of performance.

15. The system of claim 1, further comprising:
a machine learning logics adapted to carry out comparisons of data of energy behavior of individual nodes of said plurality of nodes.

16. The system of claim 1, further comprising:
a predictive logics adapted to anticipate consumption scenarios based on at least one of weather forecasts, sun forecasts, consumption curve, a state of charge of accumulators, and pricing changes of the external electrical energy grid.

17. The system of claim 1, further comprising:
a cost-effectiveness logics adapted to schedule energy of the energy community based on at least one of a pricing plan for active nodes of said plurality of nodes, active capacity/market services, availability of a secondary discharge market and a balancing of costs.

* * * * *